UNITED STATES PATENT OFFICE.

SAMUEL PEACOCK, OF CHICAGO, ILLINOIS.

PROCESS OF RENDERING COMMERCIAL SALTS NON-CORROSIVE.

1,036,896.　　　　　Specification of Letters Patent.　　Patented Aug. 27, 1912.

No Drawing.　　　Application filed June 17, 1911.　Serial No. 633,835.

*To all whom it may concern:*

Be it known that I, SAMUEL PEACOCK, a citizen of the United States, residing at Chicago, in the county of Cook and State of Illinois, have invented certain new and useful Improvements in Processes of Rendering Commercial Salts Non-Corrosive; and I do hereby declare the following to be a full, clear, and exact description of the invention, such as will enable others skilled in the art to which it appertains to make and use the same.

This invention relates to a process of rendering commercial salts non-corrosive, and has for its especial object to provide a simple and inexpensive method by which certain salts of commerce may be prevented from absorbing moisture, and thereupon corroding or otherwise injuring their containers during storage and shipping.

To these ends the invention consists in the novel steps constituting my process more fully hereinafter disclosed and particularly pointed out in the claims.

As is well known, there are a number of commercial salts which are deliquescent and normally moist only because they contain impurities that readily absorb water, the chemically pure salt being in itself non-deliquescent. Such impurities usually contain a free acid and they cannot be separated from the salt by any washing or other economical process heretofore known, so they are at present allowed to remain in the salt. When these salts are produced by the direct action of the acid upon the base, examples of such salts will be;—mono-calcium phosphate $CaH_4.(PO_4)_2.H_2O$; mono-potassium phosphate $K_2H_4.(PO_4)_2.H_2O$; ammonium nitrate $(NH_3.NO_3)$ and potassium nitrate $KNO_3$, and a small amount of free acid remains in the commercial product and resists economical removal by washing as above stated. This free acid, however, greedily absorbs water, and causes a continual wet or moist condition of the salt, and the consequent formation of lumps, as well as a corrosive action upon the containers, and other well known undesirable qualities. According to my invention, I remedy this condition by treating the salt thus contaminated with ammonia gas, thereby fixing the free acid as a salt of ammonia.

In practice I prefer to pass the crude salt rendered as dry as convenient through an atmosphere of ammonia gas, contained in a suitable closed vessel provided with stirrers so that the gas may reach every particle of the salt. The free acid present is thus converted into a salt of ammonia, but the latter is formed in such small quantities that its presence as an impurity is not injurious to the commercial salt. In fact, if said salt is to be used for fertilizer purposes, this said impurity would have a beneficial tendency.

What I claim is:—

1. The process of rendering commercial salts composed of non-deliquescent compounds mixed with deliquescent acid impurities, non-corrosive as a whole, which consists in suitably subjecting said commercial salts to the action of ammonia gas until substantially all of said impurities are converted into salts of ammonia, substantially as described.

2. The process of rendering commercial salts containing a free acid as an impurity non-injurious to their containers, which consists in subjecting the same to the action of an atmosphere of ammonia gas while stirring and finely dividing the mass and thereby neutralizing said acid, substantially as described.

In testimony whereof, I affix my signature, in presence of two witnesses.

SAMUEL PEACOCK.

Witnesses:
　EDWARD L. BASH,
　S. HANNA.